United States Patent [19]

Ince et al.

[11] Patent Number: 5,028,268

[45] Date of Patent: Jul. 2, 1991

[54] METHOD FOR IMPROVING THE RHEOLOGY OF CALCINED KAOLIN CLAY PRODUCTS

[75] Inventors: Dursun E. Ince; Paul R. Suitch, both of Milledgeville; Hilary Burgamy; Tony May, both of Sandersville, all of Ga.

[73] Assignee: E.C.C. America Inc., Atlanta, Ga.

[21] Appl. No.: 499,035

[22] Filed: Mar. 26, 1990

[51] Int. Cl.$^5$ .............................................. C04B 14/10
[52] U.S. Cl. ................................... 106/416; 106/485; 106/486; 501/148; 501/147
[58] Field of Search ................ 501/148, 147; 106/416, 106/485, 486

[56] References Cited

U.S. PATENT DOCUMENTS

| | | | |
|---|---|---|---|
| 3,372,043 | 3/1968 | Fanselow | 106/72 |
| 3,383,438 | 12/1965 | Allegrini et al. | 263/52 |
| 3,586,523 | 6/1971 | Fanselow et al. | 106/288 B |
| 3,754,712 | 8/1973 | Cecil | 241/16 |
| 3,846,147 | 11/1974 | Tapper | 106/288 B |
| 4,118,245 | 10/1978 | Hamill et al. | 106/288 B |
| 4,118,246 | 10/1978 | Horzepa et al. | 106/288 B |
| 4,381,948 | 5/1983 | McConnell et al. | 106/288 B |
| 4,820,554 | 4/1989 | Jones et al. | 427/391 |

*Primary Examiner*—William R. Dixon, Jr.
*Assistant Examiner*—Alan Wright
*Attorney, Agent, or Firm*—Klauber & Jackson

[57] ABSTRACT

The rheology of an aqueous slurry of a calcined kaolin clay powder is significantly improved by spray drying a slurry of the calcined kaolin clay powder, recovering the spray-dried material, and forming an aqueous slurry from said spray-dried material.

11 Claims, 4 Drawing Sheets

200UM

1UM

2UM

2UM

METHOD FOR IMPROVING THE RHEOLOGY OF CALCINED KAOLIN CLAY PRODUCTS

FIELD OF THE INVENTION

This invention relates generally to calcined clay products, and more specifically relates to a method for treating a substantially anhydrous white kaolin clay powder so as to improve the rheological properties of an aqueous suspension of the said kaolin.

BACKGROUND OF THE INVENTION

In the course of manufacturing paper and similar products, including paper board and the like, it is well known to incorporate quantities of inorganic materials into the fibrous web in order to improve the quality of the resulting product. A number of inorganic materials have long been known to be effective for these purposes, such as titanium dioxide, which can be incorporated into the paper in the form of anatase or rutile. Titanium dioxide, however, is among the most expensive materials which are so usable. Accordingly, in recent years, considerable efforts have been made to develop satisfactory replacements for the said titanium dioxide.

Among the materials which have thus found increasing acceptance as paper fillers are substantially anhydrous kaolin clays. Materials of this type are generally prepared by partially or fully calcining a crude kaolin clay, which may have been initially subjected to prior beneficiation steps in order to remove certain impurities, e.g. for the purpose of improving brightness in the ultimate product. It is important for an understanding of the present invention, to recognize that those skilled in the art of kaolin processing draw a sharp and fundamental distinction between uncalcined and calcined kaolins. With respect to terminology, it is noted that the prior art literature, including numerous of the prior art patents relating to the field of kaolin products and processing, often uses the term "hydrous" to refer to a kaolin which has not been subjected to calcination—more specifically, which has not been heated to temperatures above about 450° C., which temperatures serve to alter the basic crystal structure of kaolin. These so-called "hydrous" clays may have been produced from crude kaolins, which have been subjected to beneficiation, as, for example, to froth flotation, to magnetic separation, to mechanical delamination, grinding, or similar comminution, but not to the mentioned heating as would impair the crystal structure.

In an accurate technical sense, the description of these materials as "hydrous" is, however, incorrect. More specifically, there is no molecular water actually present in the kaolinite structure. Thus, although the composition can be (and often is) arbitrarily written in the form $2H_2O.Al_2O_3.2SiO_2$, it is now well-known that kaolinite is an aluminum hydroxide silicate of approximate composition $Al_2(OH)_4Si_2O_5$ (which equates to the hydrated formula just cited). Once the kaolin is subjected to calcination, which, for the purposes of this specification means being subjected to heating of 450√ C. or higher for a period which eliminates the hydroxyl groups, the crystalline structure of the kaolinite is destroyed. As used in this specification, the term "calcined kaolin" shall refer to such a kaolin. Preferably the calcined kaolin has been heated above the 980 C. exotherm, and therefore is "fully calcined", as opposed to having been rendered merely a "metakaolin". Reference may be had in the foregoing connection to Proctor, U.S. Pat. Nos. 3,014,836 and to Fanselow et al. 3,586,823, which disclosures are representative of portions of the prior art pertinent to fully calcined kaolins.

A calcined product having characteristics generally superior to previously available such calcined kaolin pigments, is the ALPHATEX ® product of E.C.C. America Inc., assignee of the present application. This product again is a substantially anhydrous white kaolin clay pigment, which has unusual efficacy as a filler in paper sheets and similar paper products. The pigment also has application as a coating pigment for paper, and as a pigment in paints and other filled systems. It generally consists of aggregates of anhydrous kaolin clay particles, and exhibits exceptionally high lightscatter and opacifying characteristics when incorporated as a filler in paper.

ALPHATEX ® is further described in U.S. Pat. No. 4,381,948 to A.D. McConnell et al, as being an anhydrous white kaolin clay pigment having high light scattering when incorporated as a filler in paper, the pigment consisting of porous aggregates from sub-micron sized kaolin clay platelets obtained by classification of a dispersed kaolin clay to a 100% less than one micron ESD fraction, the aggregates having an average specific gravity in the range of 0.5 to 0.6 and a mean internal pore size of less than 0.55 microns. The size distribution of the aggregates is such that no more than 5% by weight thereof are greater than 10 microns ESD, at least 75% are of less than 2 microns ESD, and not more than 15% by weight are of less than 1 micron ESD. The pigment has a Valley abrasion value below 30 mg., and a G.E. brightness of at least 93.

Calcined kaolin clay products such as ALPHATEX ® are normally pulverized in a high energy impact mill and air-classified after calcination for the purpose of removing +325 mesh residue (to conform to specification for intended use in paper), or in order to remove larger abrasive particles. Such products are often handled, shipped and/or utilized (e.g. when coating papers) as aqueous slurries, i.e., the calcined kaolin clay is slurried in water to form a slurry, e.g., of approximately 40% to 60% solids content, more or less. It is desired that the slurry not be unduly viscous since the more viscous the product generally the more difficult it is to handle and to use.

It is important, therefore, to control the viscosity of the clay slurry to the extent that its handling and use are facilitated.

A large number of prior art patents are concerned with the general problem of reducing clay viscosity, such as Duke 3,326,705; Turner 4,334,985 and 4,468,317; Mavnard 3,808,021 and 3,857,781; and Abercrombie, Jr. 4,144,084 and 4,144,085. These teachings, however, are applicable to hydrous clays, and commonly involve chemical control by additives or elimination of a species tending to cause viscosity problems. The prior art bearing upon viscosity control in calcined clay slurries is more limited, but often involves some type of milling or comminution of the calcined material.

According to Cecil, U.S. Pat. No. 3,754,712, for example, a fluid suspension or slurry of calcined kaolin clay is wet milled in the presence of grinding media, with incremental additions of calcined kaolin clay being added and wet milling continued until the viscosity of the slurry is reduced. Also of interest in this connection are Horzeoa et al. U.S. Pat. No. 4,118,246; and Hamill et al 4,118,245. While more applicable to chemical stabilization of calcined clay slurries, reference may also be had to Tapper 3,846,147; and Eggers 4,017,324.

While the foregoing teachings are of value, it is desirable to be able to reduce the viscosity of slurries of calcined clay, without adding special chemical agents to the slurry and without the use of the prolonged processing inherent in the grinding methods of teachings such as Cecil, Horzepa et al, etc.

OBJECTS OF THE INVENTION

It is, accordingly, an object of the invention to provide a simple and highly effective method for improving the rheology characteristics of a calcined kaolin clay.

It is another object of the invention, to provide a calcined kaolin clay which will form aqueous slurries of reduced viscosity.

SUMMARY OF THE INVENTION

In accordance with the present invention, a calcined, pulverized and optionally milled kaolin clay, is formed into an aqueous slurry, and the slurry is spray-dried. The improved beaded product, when reslurried as a high solids aqueous suspension is found to possess unexpectedly improved rheological properties, such as reduced high and low shear viscosities.

It is thus a feature of the present invention that a slurry formed from the spray-dried clay has a low-shear (Brookfield) viscosity which is significantly lower than the corresponding viscosity of a slurry formed from the same calcined kaolin clay which has not been spray dried in accordance with the invention. The high-shear (Hercules) viscosity is also materially improved. These changes in viscosity greatly facilitate the handling of slurries containing the calcined clay.

It is appreciated that spray drying has been heretofore employed in the processing of slurries of hydrous, i.e. uncalcined kaolins, including in the course of processing uncalcined kaolins to prepare a feed for subsequent calcination. In Fanselow. U.S. Pat. No. 3,372,043, for example, a spray dried clay product is produced by spray drying a beneficiated hydrous kaolin in the presence of a small amount of an added colloidal attapulgite clay. With respect to preparation of a calciner feed clay, Fanselow et al U.S. Pat. No. 3,586,523 is of interest in describing a process in which the starting material, a fine particle-sized kaolin crude is crushed, dispersed in water, degritted, classified to remove nearly all particles larger than about 2 microns ESD (equivalent spherical diameter), and chemically bleached with or without flotation beneficiation. Specifically, the filter cake from bleaching containing about 60% solids, is fluidized by adding a small amount of ammonium hydroxide. The dispersed slip is then spray dried and pulverized to provide a feed stock. This feed is then calcined, followed by pulverization. This patent therefore describes some basic operations in the production of calcined kaolin pigments, but nothing is disclosed about spray drying the final calcined product.

This is also true of the above-mentioned McConnell et al, U.S. Pat. No. 4,381,948, which describes the preparation of a kaolin clay pigment consisting of high light scattering porous aggregates of kaolin clay platelets, having certain properties of specific gravity, porosity and size distribution. The method of preparation typically comprises forming an aqueous dispersion of the crude clay at e.g. 60% solids, diluting with water to 15% solids, degritting, and subjecting to a particle size separation by centrifuging. From such separation a kaolin slurry of clay is recovered in which substantially all particles are less than 1 micron ESD. The slurry is dried by spray drying, pulverized, calcined under controlled temperature conditions, and again pulverized. Again, nothing is disclosed about spray drying the calcined product.

Cummings et al, U.S. Pat. No. 4,717,559, also shows the spray drying of a kaolin clay slurry in the course of its being prepared for calcining.

The discovery and use of spray drying of previously calcined kaolin clay to bring about surprising improvements in its rheological properties, however, are to these applicants' knowledge, heretofore unknown. The improvements are all the more unexpected and surprising, when it is appreciated that the present process involves a reslurrying and spray drying of a product that has already been extensively beneficiated and subjected to high temperature calcining and pulverization. As one aspect of the invention, and contrary to the teachings of the prior art, in a sense, one thus adds water to a product that has previously been extensively processed to remove structural water. Despite this, it is found that the resulting product of the present invention, fundamentally remains a calcined clay—it is not rendered a hydrous clay. The moisture content in the resulting bead-like structures formed by the spray drying is less than about 1.0% by weight, generally being from about 0.4 to 0.7%. When these beads are reslurried, it is found that the resultant particle size distribution (PSD) in the slurry is substantially the same as it was for the calcined kaolin powder prior to the spray drying. Hence, it appears that the PSD is not permanently altered by the spray drying; rather one apparently creates a bead which while combining the water and particulate calcined kaolin, does so in a simple mechanical form, which is readily disruptible upon upon reslurrying of the beads.

DETAILED DESCRIPTION OF THE PREFERRED EMBODIMENTS

Figure 1:
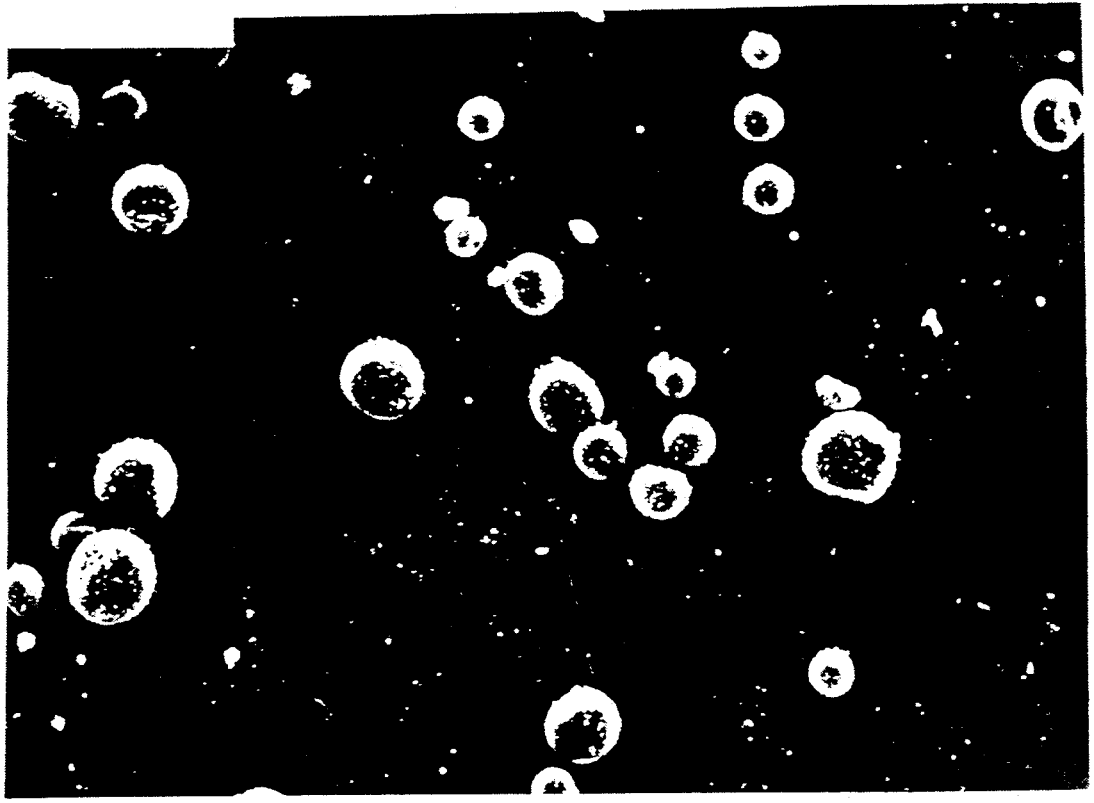
FIG. 1 is an electron photomicrograph of a spray dried product in accordance with the invention.

The calcined clay slurry to be spray dried in accordance with this invention is prepared by slurrying in water a calcined, powdered kaolin clay, as for example that described in U.S. Pat. No. 4,381,948, to provide a slurry of about 25-50% solids content. The said McConnell et al U.S. Pat. No. 4,381,948 is incorporated herein by reference. The kaolin clay may have been pulverized as described in McConnell et al and could optionally have been subjected to additional milling, including as described in U.S. Pat. Nos. 4,561,597 and 4,693,427. Similarly, other calcined kaolins can be treated by the invention, such as the products disclosed in the aforementioned Nos. 3,586,523, 3,014,836, 4,693,427, and 4,561,597. Preferably, a slurry with a solids content of at least about 35% is employed. Slurries with lower solids content, e.g. 25%, can be used but they have been found to lead to a lesser increase in bulk density. Slurries of greater solids content can be employed, but in some cases they tend to be more difficult to prepare.

The thus-prepared slurry is thereupon spray dried in conventional manner in conventional spray-drying apparatus. For example, the spray dryer may be of the cocurrent, counter-current or mixed-flow type. Nozzles, discs or the like can be used to disperse the slurry into droplets. The temperature of the inlet and outlet air in the spray dryer will depend, of course, on the design of the dryer. The temperature should be such that the bulk of moisture is removed. A rotary disc spray dryer has been found to be particularly effective. In a typical procedure the slurry is cocurrent spray-dried in such a device using an air inlet temperature of 980° to 1100° F., and an air outlet temperature of 225° to 235° F.

In some instances, a small amount of a conventional binder or stabilizer can be added to the slurry, such as an alginate, e.g. 2 to 10 pounds per ton, based on the weight of the dry clay. Other like water soluble binders such as carboxy methylcellulose (CMC), hydroxy ethyl cellulose, polyvinyl alcohol, polyvinyl pyrrolidone; bentonites; or combinations of such materials can be used. In other instances, a binder will not be used, because of possible residue problems caused by same. A small amount of a dispersing agent, such as a condensed phosphate, illustrated by tetra-sodium pyrophosphate, sodium hexametaphosphate and sodium tripolyphosphate, and like dispersants well known in the art, may also be incorporated into the slurry to be spray dried. Such dispersants are typically employed in the amount of 2 to 10 pounds per ton of dry clay.

Surprisingly and unexpectedly, when the calcined kaolin clay is subjected to spray drying, and the spray-dried product is then slurried in water the viscosity of the slurry is dramatically changed.

Of particular significance, is the fact that the process of the invention does not affect the already favorable other properties of the calcined clay; and thus the characteristics of the calcined kaolin clay powder which render the same of such great value in paper filling and coating, are not impaired by the method of the invention, i.e. all of the desirable characteristics which are provided to the paper by the use of such material, such as (when used as a filler) increase in opacity, high light scattering, etc., remain substantially intact. As already mentioned, the bead-like product of the invention, when reslurried for use e.g. in paper compositions, yields a PSD substantially that which would be yielded by slurrying the kaolin clay powder without the treatment of the present invention.

The following specific examples serve to illustrate the present invention.

EXAMPLE 1

A 50% solids slurry of ALPHATEX® was prepared, to which had been added 3 #/ton of tetrasodium pyrophosphate and 3 #/ton KELGIN® (trademark of Kelco, Inc., San Diego, Calif., for a sodium alginate) as a stabilizer. This slurry had a Brookfield viscosity of 260 centipoise. Another sample (500 lb.) of ALPHATEX® to which 3 #/ton of tetrasodium pyrophosphate and 3 #/ton of Kelgin had been added as stabilizer, was made into a 40% slurry. This slurry was then spray dried in a rotary disc spra dryer (750° F. inlet and 225° F. outlet temperature), and the spray-dried material consisting of 10–50 μm beads, having 0.5–0.6% moisture, was reslurried in water at 50% solids. The Brookfield viscosity of the 50% solids content slurry was found to be only 90. The spray-dried material was also made into slurries of 55% to 60% and found to have good rheological properties. The results of these experiments with the slurried spray-dried material are shown in the following Table 1.

TABLE 1

| Low Shear Viscosity (Brookfield, cps) of Spray-Dried ALPHATEX ® | |
|---|---|
| % Solids | Viscosity |
| 60 | 1100 |
| 59 | 810 |
| 58 | 590 |
| 57 | 440 |
| 56 | 340 |
| 55 | 260 |
| 50 | 90 |

EXAMPLE 2

In like manner, another sample (500 lb) of the same ALPHATEX® was made into a slurry of 50% solids content, all as described in Example 1. The spray-dried product resulting from this slurry was comparable to that obtained in Example 1, having a Brookfield viscosity of only 210 cps even when made into an aqueous slurry of 55% solids content; and a slurry of the spray-dried material of 58% solids had a Brookfield viscosity of 440 cps; and a slurry of 60% solids had a Brookfield viscosity of 1010 cps.

EXAMPLE 3

In this example the original slurry and the slurries of spray-dried calcined kaolin clay described in Examples 1 and 2 were measured for high shear viscosity (Hercules rpm at dynes). The results are shown in Table 3 below.

TABLE 3

| | High Shear Viscosity (Hercules rpm at 18 dynes) | | |
|---|---|---|---|
| % Solids | Non-spray-dried ALPHATEX ® | Spray-dried 40% solids ALPHATEX ® | Spray-dried 50% solids ALPHATEX ® |
| 60 | — | 120 | 200 |
| 59 | — | 120 | — |
| 58 | — | 260 | 260 |
| 57 | — | 560 | — |
| 56 | — | 1000 | — |
| 55 | — | 1800 | 760 |
| 50 | 1500 | 2960 | — |

EXAMPLE 4

A sample of ALPHATEX® was made into a 50% solids slurry to which 3 lbs/ton of tetrasodium pyrophosphate was added but no stabilizer. This slurry was spray dried as described in Example 1 and the spray-dried material was reslurried into slurries of 55%, 58% and 60% solids content. These slurries of spray-dried material were then tested for low shear viscosity (Brookfield) and high shear viscosity (Hercules rpm at 18 dynes). The results are shown in Tables 4 and 4A below and compared with corresponding slurries in Examples 2 and 3.

TABLE 4

| | Low Shear Viscosity (Brookfield, cps) | |
|---|---|---|
| % Solids | Spray-dried 50% Solids ALPHATEX With Stabilizer | Spray-dried 50% Solids ALPHATEX Without Stabilizer |
| 60 | 1010 | 400 |
| 58 | 440 | 170 |
| 55 | 210 | 80 |

TABLE 4A

| | High Shear Viscosity (Hercules rpm at 18 dynes) | |
|---|---|---|
| % Solids | Spray-dried 50% Solids ALPHATEX With Stabilizer | Spray-dried 50% Solids ALPHATEX Without Stabilizer |
| 60 | 200 | 260 |
| 58 | 260 | 260 |
| 55 | 760 | 920 |

EXAMPLE 4

The procedure of Example 1 was followed except that the ALPHATEX® slurry spray dried included 50% solids. The spray dried product was found to include beads in the general size range of −10 mesh to 50 micrometers. This product was made down as a 50% solids slurry with the aid of 3 lbs/ton of TSPP as a dispersant. Particle size determinations were made on the made down product and compared with two 50% solids ALPHATEX® slurries, with results as follows:

TABLE II

| Sample | Particle Size Distribution | | | |
|---|---|---|---|---|
| | $-2\mu m$ | $-1\mu m$ | $-\frac{1}{2}\mu m$ | $-\frac{1}{4}\mu m$ |
| ALPHATEX® Slurry 1 | 92 | 82 | 50 | 6 |
| ALPHATEX® Slurry 2 | 92 | 84 | 46 | 10 |
| Spray dried beads of ALPHATEX® after reslurrying | 92 | 86 | 50 | 8 |

It will be seen in Table II that the product of the invention, while being initially in the form of spray dried beads, upon being made down into an aqueous slurry, shows a PSD essentially as in the original dried calcined material when the latter is formed into an aqueous slurry.

The foregoing may be better appreciated by examination of the electron photomicrographs of FIGS. 1 through 4.

FIG. 1 is a 112X electron photomicrograph of a sample of a spray dried product of the type described in Example 1 herein. The individual highly spherical beads are clearly seen. This should be compared with FIG. 2, however, wherein a 31,700X magnification of the surface of one of the beads of FIG. 1 is seen. Here, large numbers of individual clay particles are seen, of very minute dimensions. The scales in each case are shown on the photographs.

Figure 2:
FIG. 2 is an electron photomicrograph of the surface of a bead in the FIG. 1 product.
Figure 3:
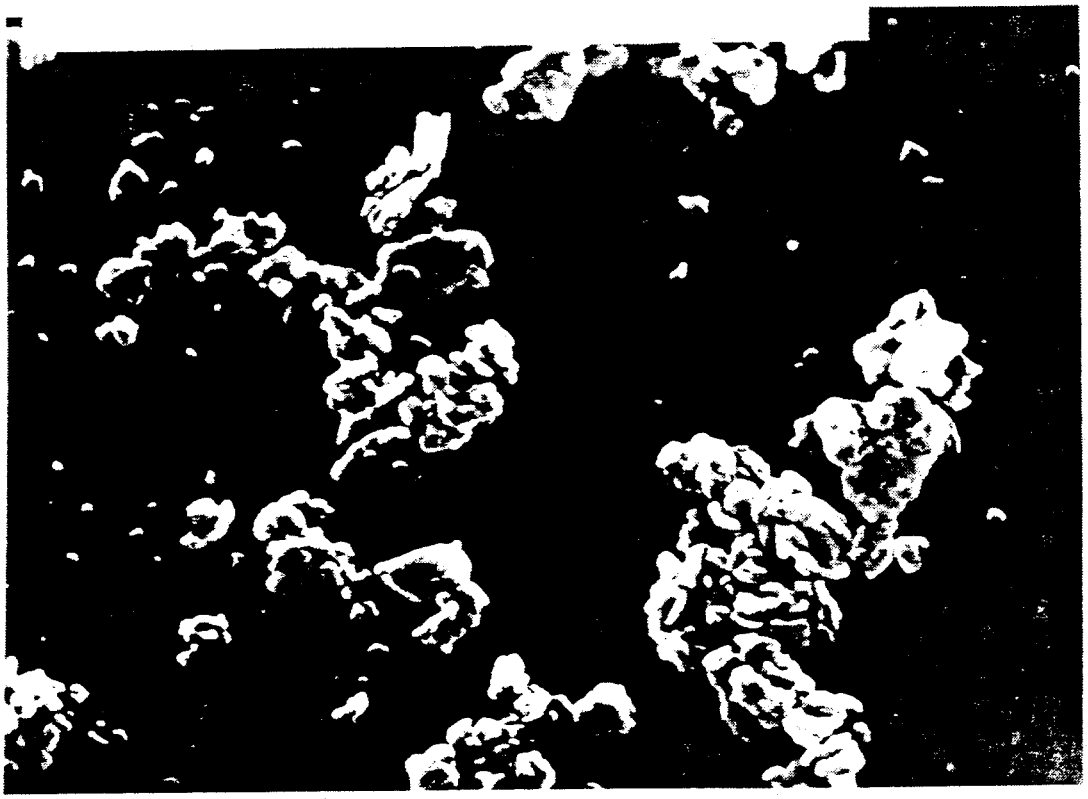
FIG. 3 is an electron photomicrograph showing the FIG. 1 product after same is slurried.
Figure 4:
FIG. 4 is an electron photomicrograph of a sample of a commercial calcined clay product.

In FIG. 3, the product of FIG. 1 is shown subsequent to it being made down as described in the present Example 4. It is now seen that the individual clay particles present at the surface of the beads, as shown in FIG. 2, have been released. It is instructive to compare this with FIG. 4 showing at a 10,400X magnification the dispersed ALPHATEX® from the calciner. The similarity in appearance between the showing of FIG. 3 and 4 will be evident. Thus it will be clear that the beaded structures of FIG. 1 provided in accordance with the invention, actually retain the individual minute kaolin particles in substantially the form in which same existed prior to the spray drying of the slurried powder, except that the individual minute kaolin particles are locked into the bead-like composites, to be released on reslurrying. The advantage of this is that the kaolin product, when in the spray-dried form, possesses such advantages as ease of handling, higher bulk density and the like in accordance with the invention; and yet when reslurried, the material has the same advantages otherwise known in the prior art—i.e. when used in papermaking processes.

EXAMPLE 5

In this Example, the spray dried product properties of an ALPHATEX® slurry, with stabilizer, were compared with the characteristics of a product spray-dried from a slurry without the stabilizer. The stabilizer utilized was the Kelzan® product of Kelco, Inc., which is a sodium alginate.

Specifically, an ALPHATEX® slurry with 50% solids was prepared using 31 lbs/ton of Kelzan®, and a similar slurry prepared with no Kelzan®. Each of these products was spray dried using apparatus as in Example 1 and with an inlet temperature of 750° F. and an outlet temperature held at 225° to 250° F. The resulting products were compared and were found to be very similar within the limits of experimental error. The product in which the Kelzan® was present yielded beads with 0.8% moisture and showed a bulk density of 36.1 lbs/ft$^3$. The size distribution of particles when this dried product was made down showed by weight 89% <2 microns; 79% <1; 45% <0.5; and 8% by weight <0.25 microns. In the case of the product produced without the Kelzan®, moisture in the beads was 0.8% by weight. Bulk density was 39.7 lbs/ft$^3$. PSD was 88% <2; 78% <1; 41% <0.5; and 9% <0.25 microns. When tested for brightness using the conventional G.E. Scale and TAPPI procedure T646os-75, the product with Kelzan® yielded 90.1, and without 92.4. It will be evident that the product of the invention may be readily produced with or without the stabilizing binder and is equally effective.

While the present invention has been particularly set forth in terms of specific embodiments thereof, it will be understood in view of the instant disclosure, that numerous variations upon the invention are now enabled to those skilled in the art, which variations yet reside within the scope of the present teaching. Accordingly, the invention is to be broadly construed, and limited only by the scope and spirit of the claims now appended hereto.

We claim:

1. A process for preparing an aqueous product slurry of a calcined kaolin clay having reduced low and high shear viscosities, comprising in sequence the steps of (a) beneficiating a crude kaolin clay to provide a calciner feed; (b) calcining the said feed; (c) slurrying the calcined kaolin to form an aqueous processing slurry thereof; (d) spray drying the processing slurry of calcined kaolin clay; and (e) preparing an aqueous product slurry from the spray-dried calcined kaolin clay.

2. A process as defined in claim 1, wherein the processing slurry of step (c) which is spray dried in step (d) has a solids content or about 25-50% by weight.

3. A process as defined in claim 1, wherein the processing slurry has a solids content of at least 35% by weight.

4. A process as defined in claim 1, wherein said processing slurry of calcined kaolin clay contains from 2 to 10 pounds per ton based on the weight of the dry clay of a water-soluble stabilizer.

5. A process as defined in claim 1, wherein said processing slurry of calcined kaolin clay is free from water-soluble stabilizers.

6. A process for treating a calcined kaolin clay powder to provide a product which as an aqueous product slurry has reduced low and high shear viscosities, which comprises forming said calcined kaolin powder to be treated into an aqueous processing slurry, spray drying the processing slurry, and recovering the spray-dried calcined kaolin as product.

7. A process in accordance with claim 6, wherein said kaolin powder is fully calcined.

8. A process as defined in claim 6, wherein said processing slurry has a solids content of about 25-50% by weight.

9. A process as defined in claim 6, wherein said processing slurry has a solids content of at least 35% by weight.

10. A calcined kaolin product providing improved rheological characteristics when dispersed in an aqueous product slurry; said product being comprised of spray dried beads from an aqueous processing slurry of a calcined kaolin, the moisture content of said beads being in the range of 0.03 to 1%.

11. A product in accordance with claim 10, wherein said kaolin has been calcined at sufficient temperatures and for a sufficient period to destroy its crystalline structure.

* * * * *